(12) United States Patent
Cox

(10) Patent No.: US 9,555,490 B2
(45) Date of Patent: Jan. 31, 2017

(54) MITER SAW WITH DOUBLE BELT DRIVE

(75) Inventor: Matthew Donel Cox, Lake in the Hills, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1143 days.

(21) Appl. No.: 13/226,198

(22) Filed: Sep. 6, 2011

(65) Prior Publication Data

US 2013/0055873 A1     Mar. 7, 2013

(51) Int. Cl.
*B23D 45/04* (2006.01)
*B23D 47/12* (2006.01)

(52) U.S. Cl.
CPC ............. *B23D 45/044* (2013.01); *B23D 47/12* (2013.01); *Y10T 83/7693* (2015.04)

(58) Field of Classification Search
CPC ................... B23D 45/04–45/048; B23D 47/12
USPC .............................. 83/471.3, 473, 490, 477.2
See application file for complete search history.

(56) References Cited

U.S. PATENT DOCUMENTS

| | | | | |
|---|---|---|---|---|
| 2,787,092 | A * | 4/1957 | Smith ................... | B23D 45/042 451/231 |
| 4,403,535 | A * | 9/1983 | Serwatowski ............ | B27B 5/10 83/490 |
| 5,038,473 | A * | 8/1991 | Bradley ................. | B23D 33/08 30/388 |
| 6,314,853 | B1 * | 11/2001 | Omi et al. ....................... | 83/743 |
| 6,378,219 | B1 * | 4/2002 | Hatlee .................. | B23D 45/042 30/276 |
| 6,866,568 | B1 * | 3/2005 | Liao ..................... | B23D 45/042 125/13.01 |
| 7,228,775 | B2 | 6/2007 | Wang | |
| 7,252,027 | B2 | 8/2007 | Meredith et al. | |
| 7,707,920 | B2 * | 5/2010 | Gass et al. ...................... | 83/781 |

(Continued)

FOREIGN PATENT DOCUMENTS

| | | |
|---|---|---|
| CN | 2289633 Y | 9/1998 |
| CN | 1868646 A | 11/2006 |

(Continued)

OTHER PUBLICATIONS

International Search Report and Written Opinion in corresponding PCT Application (i.e., PCT/US2012/053864), completed Nov. 23, 2012 (12 pages).

(Continued)

*Primary Examiner* — Kenneth E Peterson
(74) *Attorney, Agent, or Firm* — Maginot Moore & Beck LLP

(57) ABSTRACT

A miter saw includes a base, a turntable, a support assembly, and a cutting arm. The turntable is rotatably connected to the base, and the support assembly fixedly extends from the turntable. The cutting arm is pivotally connected to the support assembly. The miter saw further includes an arbor assembly, a gear assembly, a first belt member, and a second belt member.

The arbor assembly is rotatably supported by the cutting arm. The gear assembly is supported by the cutting arm and positioned outside of a nominal blade space of the miter saw. The first belt member is operatively connected to the arbor assembly and the gear assembly. The second belt member is operatively connected to the gear assembly and to a motor shaft.

11 Claims, 5 Drawing Sheets

(56) References Cited

U.S. PATENT DOCUMENTS

| | | | |
|---|---|---|---|
| 2005/0056128 A1* | 3/2005 | Chang | B23D 45/044 83/100 |
| 2005/0247177 A1 | 11/2005 | Hetcher et al. | |
| 2006/0266185 A1 | 11/2006 | Takase et al. | |
| 2008/0302224 A1 | 12/2008 | Chen et al. | |
| 2010/0105301 A1* | 4/2010 | Whelan | B23D 45/16 451/359 |

FOREIGN PATENT DOCUMENTS

| | | |
|---|---|---|
| CN | 2912876 | 6/2007 |
| CN | 101004206 A | 7/2007 |
| CN | 101104210 A | 1/2008 |
| CN | 201158102 Y | 12/2008 |
| CN | 101450398 A | 6/2009 |
| CN | 201271763 Y | 7/2009 |
| CN | 201350527 Y | 11/2009 |
| CN | 201881001 U | 6/2011 |
| EP | 1604764 A1 | 12/2005 |
| EP | 1878525 A1 | 1/2008 |

OTHER PUBLICATIONS

English Translation of Chinese Search Report and Written Opinion corresponding to Chinese application 201280054434.9 (7 pages).

* cited by examiner

US 9,555,490 B2

MITER SAW WITH DOUBLE BELT DRIVE

FIELD

This patent relates generally to miter saws and particularly to a drivetrain for a miter saw.

BACKGROUND

Miter saws are used for sawing material, for example, construction lumber. The typical miter saw includes a base configured for placement on a stand, a table, or on the ground. A turntable is rotatably connected to the base. The turntable defines a workpiece support surface, which is used to support a workpiece to be cut by the miter saw. A support assembly of the miter saw extends from the base. A cutting arm is movably connected to the support assembly. The cutting arm includes an electric motor configured to rotate a circular saw blade. The cutting arm is movable relative to the support assembly and the base, such that the saw blade is movable upward and downward in relation to the turntable in order to cut a workpiece positioned thereon. The cutting arm of a compound miter saw or a sliding compound miter saw is also movable relative to the support assembly about a bevel axis, thereby enabling the saw blade to make beveled cuts on the workpiece.

On at least some miter saws, the position of the electric motor limits the degree to which the cutting arm is movable about the bevel axis. In particular, the electric motor often extends from the cutting arm near an axis of rotation of the saw blade. For example, the electric motor may extend from the cutting arm on the right side of the saw blade. As a result, when the cutting arm is moved about the bevel axis in a clockwise direction, the electric motor is moved closer to the workpiece support surface. If the cutting arm is moved far enough about the bevel axis, the electric motor may contact the workpiece, the workpiece support surface, or another portion of the miter saw thereby limiting movement of the cutting arm. The cutting arm may be prevented from moving any further in the clockwise direction about the bevel axis, or the cutting arm may be limited downward movement.

It would, therefore, be desirable for a miter saw to have a configuration in which the electric motor does not limit rotation of the cutting arm about the bevel axis and that also does not limit downward movement of the cutting arm toward the turntable.

SUMMARY

According to one embodiment of the disclosure a miter saw includes a base, a turntable, a support assembly, and a cutting arm. The turntable is rotatably connected to the base, and the support assembly fixedly extends from the turntable. The cutting arm is pivotally connected to the support assembly. The miter saw further includes an arbor assembly, a gear assembly, a first belt member, and a second belt member. The arbor assembly is rotatably supported by the cutting arm. The gear assembly is supported by the cutting arm and positioned outside of a nominal blade space of the miter saw. The first belt member is operatively connected to the arbor and the gear assembly. The second belt member is operatively connected to the gear assembly and to a motor shaft.

According to another embodiment of the disclosure a miter saw includes a base, a turntable, a support assembly, a cutting arm, an arbor, an electric motor, a transmission assembly, a first link member, and a second link member. The turntable is rotatably connected to the base. The support assembly fixedly extends from the turntable. The cutting arm is pivotally connected to the support assembly. The arbor is rotatably supported by the cutting arm. The electric motor is mounted on the cutting arm and includes a motor shaft. The transmission assembly is rotationally supported at a fixed location in relation to the cutting arm. The fixed location of the transmission assembly is outside of a nominal blade space of the miter saw. The first link member is operatively connected to the arbor and to the transmission. The second link member is operatively connected to the transmission and to the motor shaft.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
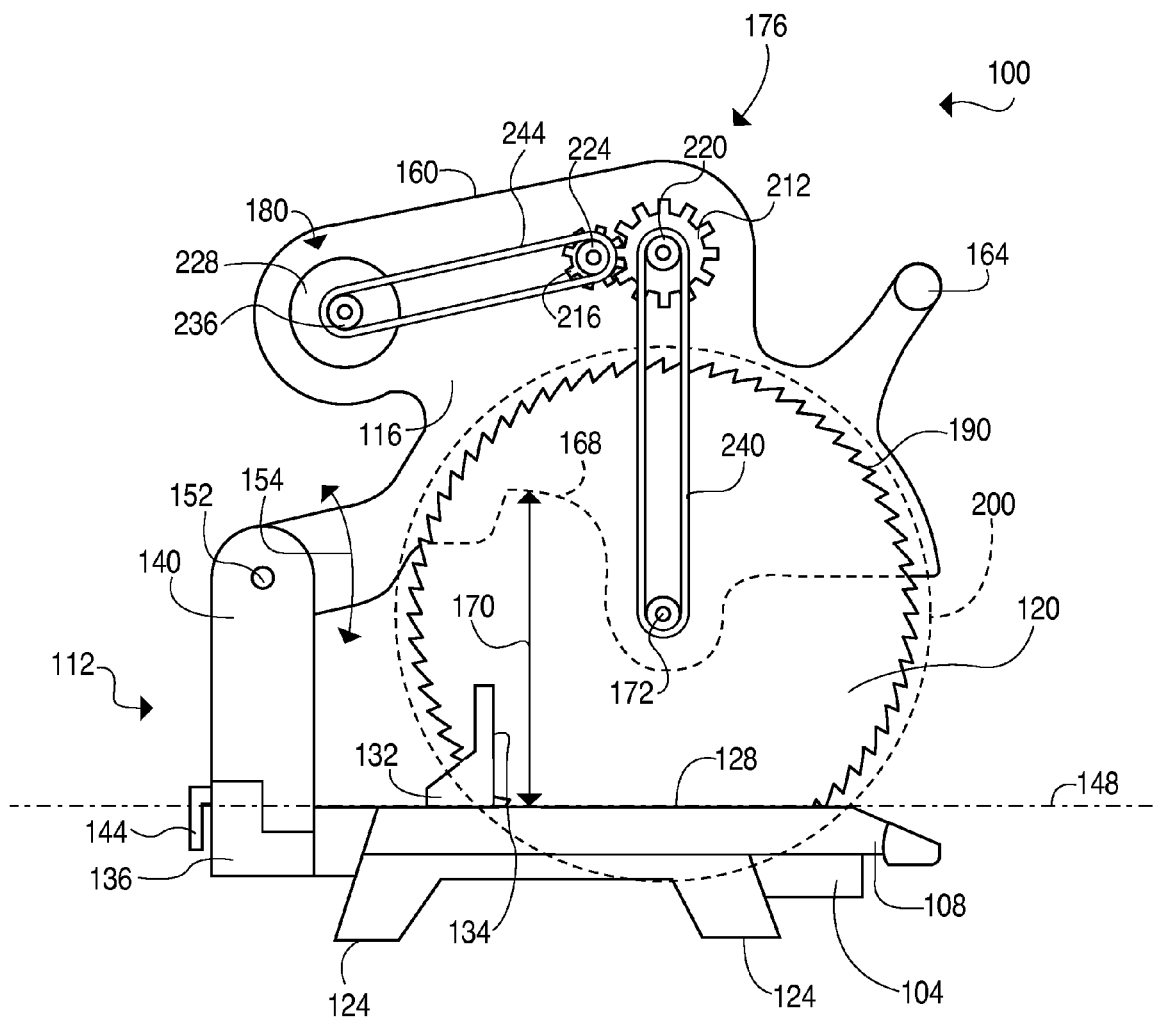
FIG. 1 is a side elevational view of a miter saw as described herein, a left shell of a cutting arm of the miter saw is not shown to enable viewing of an arbor assembly, a gear assembly, and an electric motor of the miter saw.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIG. 1 depicts a miter saw 100 that includes a base 104, a turntable 108, a support assembly 112, a cutting arm 116, and a saw blade 120. The base 104 defines numerous foot members 124, which are configured for placement on a work surface (not shown). The base 104, in this embodiment, is at least partially formed from a rigid material such as aluminum, steel, plastic, and/or other suitable materials as desired by those of ordinary skill in the art.

The base 104 includes a fence member 132 configured to fixedly extend from the base. The fence member 132 defines a face 134 against which a user may position a workpiece to be cut by the miter saw 100.

The turntable 108 is rotatably supported on the base 104, such that the turntable is configured for movement relative to the base. An upper surface of the turntable 108 is configured to define a workpiece support surface 128, which is a substantially flat surface on which a user may position a workpiece to be cut by the saw blade 120. The face 134 of the fence member 132 is positionable at a right angle with respect to the workpiece support surface 128. The turntable 108 is at least partially formed from aluminum, steel, plastic, and/or other suitable materials as desired by those of ordinary skill in the art.

The support assembly 112 includes a support arm 136 and a bevel arm 140. The support arm 136 is configured to fixedly extend from a rear side of the turntable 108. As shown in FIG. 1, the support arm 136 is a separate structure, which is connected to the turntable 108. The support assembly 136 is at least partially formed from aluminum, steel, plastic, and/or other suitable materials as desired by those of ordinary skill in the art. In another embodiment, the support arm 136 is integrally formed with the turntable 108.

With continued reference to FIG. 1, the bevel arm 140 is pivotally connected to the support arm 136 by a clamp unit 144. The bevel arm 140 is configured for pivotal movement about a pivot axis 148. In particular, the bevel arm 140 is configured for movement (relative to the turntable 108) about the pivot axis 148 between a position of maximum right bevel (shown in FIG. 4), a vertical position (shown in FIG. 2), and a position of maximum left bevel (not shown). The positions of the bevel arm 140 referred to as having a right bevel may also be referred to as "motor-side" bevel positions.

The clamp unit 144 is configured to fix the position of the bevel arm 140 relative to the support arm 136 in a user-selected position within the range of bevel movement. The clamp unit 144 is movable between a bevel locked position and a bevel unlocked position. The bevel arm 140 is movable relative to the support arm 136 when the clamp unit 144 is in the bevel unlocked position. The bevel arm 140 is locked in a fixed position relative to the support arm 136 when the clamp unit 144 is in the bevel locked position.

The cutting arm 116 is configured for pivotal connection to the bevel arm 140 of the support assembly 112 by a pivot shaft 152. In FIG. 1, the cutting arm 116 is shown in a fully lowered position. The cutting arm 116 is movable between a raised position (not shown) and the position of FIG. 1, by pivoting about the pivot shaft 152 in the direction shown by arrow 154. The cutting arm 116 may be formed from materials including aluminum, steel, plastic, and/or other suitable materials as desired by those of ordinary skill in the art.

The cutting arm 116 includes a left shell portion 156 (shown in phantom in FIGS. 2 and 4), a right shell portion 160 (shown in phantom in FIGS. 1-4), and a handle portion 164 (see FIG. 1). The right shell portion 160 may be connected to the left shell portion 156 with a plurality of fastening members (not shown), such as screws or any other type of fastening member(s).

With reference to FIG. 1, the right shell portion 160 includes a riser portion 168, which is shown in phantom. When the cutting arm 116 is in the fully lowered position, the riser portion 168 defines an apex that is located the distance 170 away from the workpiece support surface 128. The left shell portion 156 also includes a riser portion (not illustrated). The riser portion 168 and the riser portion of the left shell portion 156 are configured to enable the miter saw 100 to cut workpieces having a height of up to the distance 170. Therefore, the miter saw is suitable for cutting tall baseboards, crown moldings, and the like.

The handle portion 164 fixedly extends from the left shell portion 156 and the right shell portion 160. The handle portion 164 is configured to be grasped by a user as the user pivots the cutting arm 116 between the raised position and the lowered position. As shown in FIG. 1, the handle portion 164 is integrally formed with one or more of the left shell portion 156 and the right shell portion 160. Alternatively, the handle portion 164 may be fixedly connected to the left shell portion 156 and the right shell portion 160.

Figure 3:
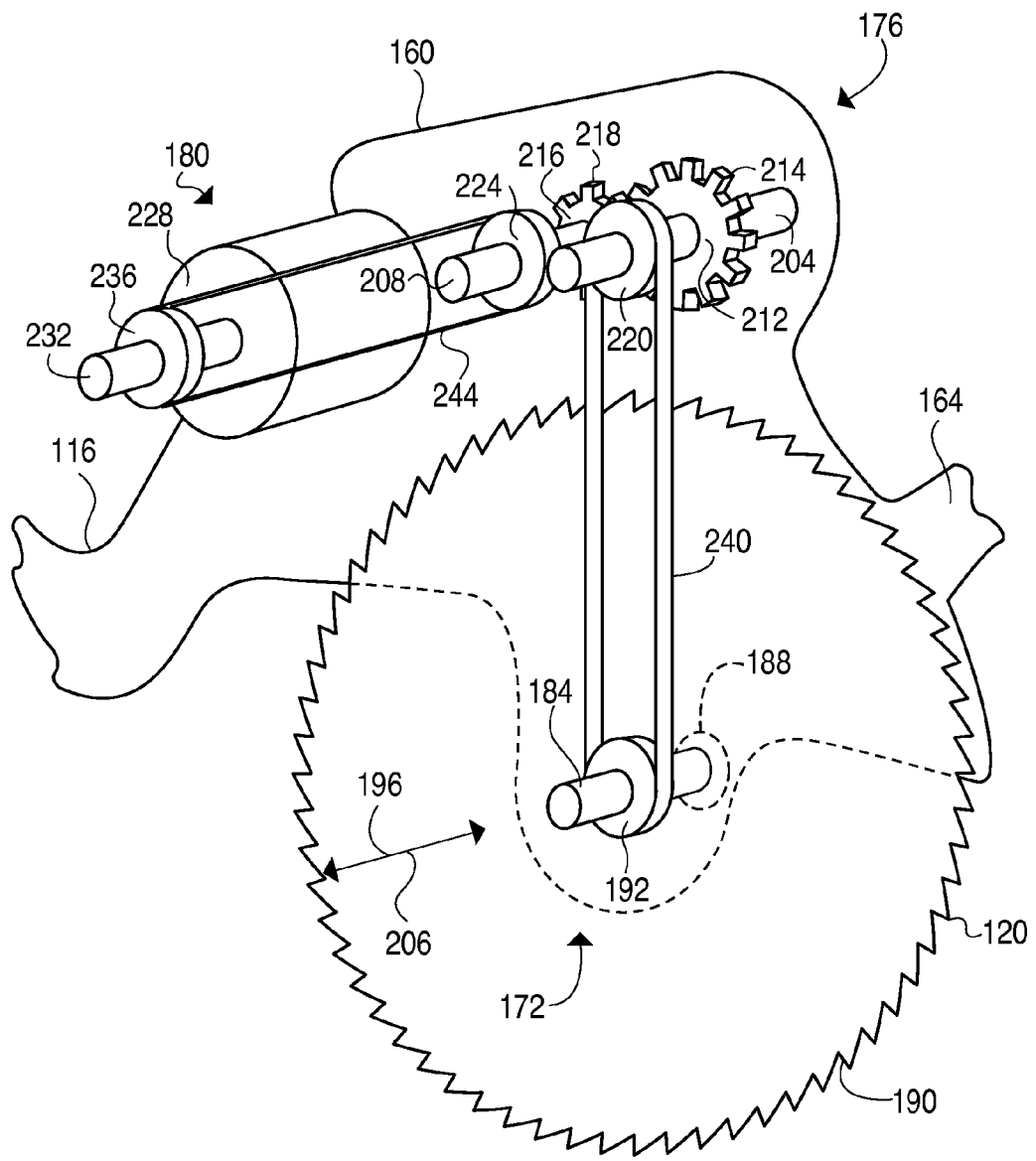
FIG. 3 is a cutaway perspective view of a portion of the cutting arm of the miter saw of FIG. 1, the left shell of the cutting arm is not shown.

As shown in FIG. 3, the miter saw 100 further includes an electric motor 180, a gear assembly 176, and an arbor assembly 172 each of which are supported at fixed locations by the cutting arm 116. The electric motor 180 includes a housing 228 and a motor shaft 232. The motor shaft 232 is configured to rotate relative to the housing 228 in response to the electric motor 180 being supplied with electrical energy.

A pulley member 236 is fixedly connected to the motor shaft 232 of the electric motor 180, such that rotation of the motor shaft results in rotation of the pulley member 236. The pulley member 236 may be formed from a rigid material, such as steel, aluminum, and/or other suitable materials as desired by those of ordinary skill in the art.

A link member, provided as a belt member 244, is engaged with the pulley member 236. The belt member 244 is configured to transfer torque from the pulley member 236 to the gear assembly 176. As provided in FIG. 3, the belt member 244 is an endless belt member operatively connected to gear assembly 176 and the motor shaft 232. The belt member 244 may be formed from a flexible material, such rubber and/or other suitable materials as desired by those of ordinary skill in the art.

With continued reference to FIG. 3, the gear assembly 176, which may also be referred to in this disclosure as a transmission assembly, includes a pulley member 224 and a gear member 216 fixedly mounted on a primary transmission shaft 208. The gear assembly 176 further includes a gear member 212 and a pulley member 220 fixedly mounted on a secondary transmission shaft 204.

The pulley member 236 and the belt member 244 transfer torque to the pulley member 224. In particular, the belt member 244 is engaged with the pulley member 224, such that rotation of the motor shaft 232 results in rotation of the pulley member 224. The pulley member 224 may be formed from a rigid material, such as steel, aluminum, and/or other suitable materials as desired by those of ordinary skill in the art. The diameters of the pulley member 236 and the pulley member 224 may be selected to achieve any desired transmission ratio between the pulley member 236 and the pulley member 224.

The primary transmission shaft 208 is rotatably supported by the cutting arm 116. In particular, a left end of the primary transmission shaft 208 is rotatably supported by the left shell portion 156, and a right end of the primary transmission shaft 208 is rotatably supported by the right shell portion 160. The torque exerted on the pulley member 224 through the belt member 244 and the pulley member 236 results in rotation of the primary transmission shaft 208. The primary transmission shaft 208 may be formed from a rigid material such as steel, aluminum, and/or other suitable materials as desired by those of ordinary skill in the art.

The gear member 216 rotates in response to rotation of the primary transmission shaft 208. The gear member 216 has a diameter, which represents the size of the gear member. The gear member 216 includes numerous gear teeth 218. The gear member 216 may be provided as any desired type of gear. The gear member 216 may be formed from a rigid material, such as steel, aluminum, and/or other suitable materials as desired by those of ordinary skill in the art.

The gear member 212 is configured to rotate in response to rotation of the gear member 216. The gear member 212 has a diameter, which represents the size of the gear member. The gear member 212 includes numerous gear teeth 214.

The gear teeth 214 of the gear member 212 are configured to meshingly engage the gear teeth 218 of the gear member 216, such that torque is transferred from the gear member 216 to the gear member 212. The gear member 212 may be provided as any desired type of gear. The gear member 212 may be formed from a rigid material, such as steel, aluminum, and/or other suitable materials as desired by those of ordinary skill in the art.

As further shown in FIG. 3, the diameter of the gear member 212 is greater than the diameter of the gear member 216. In another embodiment, the gear member 212 and the gear member 216 may have an equal diameter. In yet another embodiment, the gear member 212 may have a diameter that is less than the gear member 216.

The secondary transmission shaft 204 is rotatably supported by the cutting arm 116. In particular, a left end of the secondary transmission shaft 204 is rotatably supported by the left shell portion 156, and a right end of the secondary transmission shaft 204 is rotatably supported by the right shell portion 160. The torque exerted on the gear member 212 results in rotation of the secondary transmission shaft 204. The secondary transmission shaft 204 may be formed from a rigid material such as steel, aluminum, and/or other suitable materials as desired by those of ordinary skill in the art.

The pulley member 220 is configured such that rotation of the secondary transmission shaft 204 results in rotation of the pulley member 220. The pulley member 220 is formed from a rigid material, such as steel, aluminum, and/or other suitable materials as known to those of ordinary skill in the art. In the embodiment shown in FIG. 3, the diameter of the pulley member 224 is approximately equal to the diameter of the pulley member 220. In another embodiment, the pulley member 224 has a diameter that is different than the diameter of the pulley member 220. Accordingly, the diameters of the pulley member 224, the gear member 216, the gear member 212, and the pulley member 220 may be selected to achieve any desired transmission ratio between the pulley member 224 and the pulley member 220.

A link member, provided as a belt member 240, is engaged with the pulley member 220. The belt member 240 is configured to transfer torque from the pulley member 220 to the arbor assembly 172. As provided in FIG. 3, the belt member 240 is an endless belt member operatively connected to gear assembly 176 and the arbor assembly 172. The belt member 240 may be formed from a flexible material, such rubber and/or other suitable materials as desired by those of ordinary skill in the art.

The arbor assembly 172 includes a pulley member 192, an arbor shaft 184, and a connection element 188. The pulley member 192 of the arbor assembly 172 is fixedly connected to the arbor shaft 184. The belt member 240 is engaged with the pulley member 192, such that torque from the pulley member 220 is transferred to the pulley member 192. The pulley member 192 may be formed from a rigid material, such as steel, aluminum, and/or other suitable materials as desired by those of ordinary skill in the art. The diameters of the pulley member 220 and the pulley member 192 may be selected to achieve any desired transmission ratio between the pulley member 220 and the pulley member 192.

The arbor shaft 184 is rotatably supported by the cutting arm 116. In particular, a left end of the arbor shaft 184 is rotatably supported by the left shell portion 156, and a right end of the arbor shaft is rotatably supported by the right shell portion 160. The arbor shaft 184 defines an axis of rotation 196. Torque transferred to the pulley member 192 results in rotation of the arbor shaft 184.

The connection element 188 is removably connected to the arbor shaft 184. The connection element 188 is provided as an externally threaded bolt configured to be received by an internally threaded opening formed in the arbor shaft 184. The connection element 188 is further configured to connect the saw blade 120 to the arbor shaft 184 so that the saw blade 120 rotates with the arbor shaft 184. When the connection element 188 is removed from the arbor shaft 184, the saw blade 120 is removable from the arbor shaft to enable the saw blade to be repaired or replaced with a different saw blade. Alternatively, the connection element 188 may be differently configured as an internally threaded nut that is suited to be threaded onto an externally threaded portion of the arbor shaft 184.

The saw blade 120 is a circular saw blade configured to be mounted on the arbor shaft 184 for rotation about the axis of rotation 196. The saw blade 120 defines a central opening (not clearly shown) through which the arbor shaft 184 extends to connect the saw blade to the arbor shaft. The perimeter of the saw blade 120 includes a plurality of cutting teeth 190. Alternatively, the saw blade 120 may include a highly abrasive perimeter (not shown), as commonly provided on diamond cutting blades.

Figure 2:
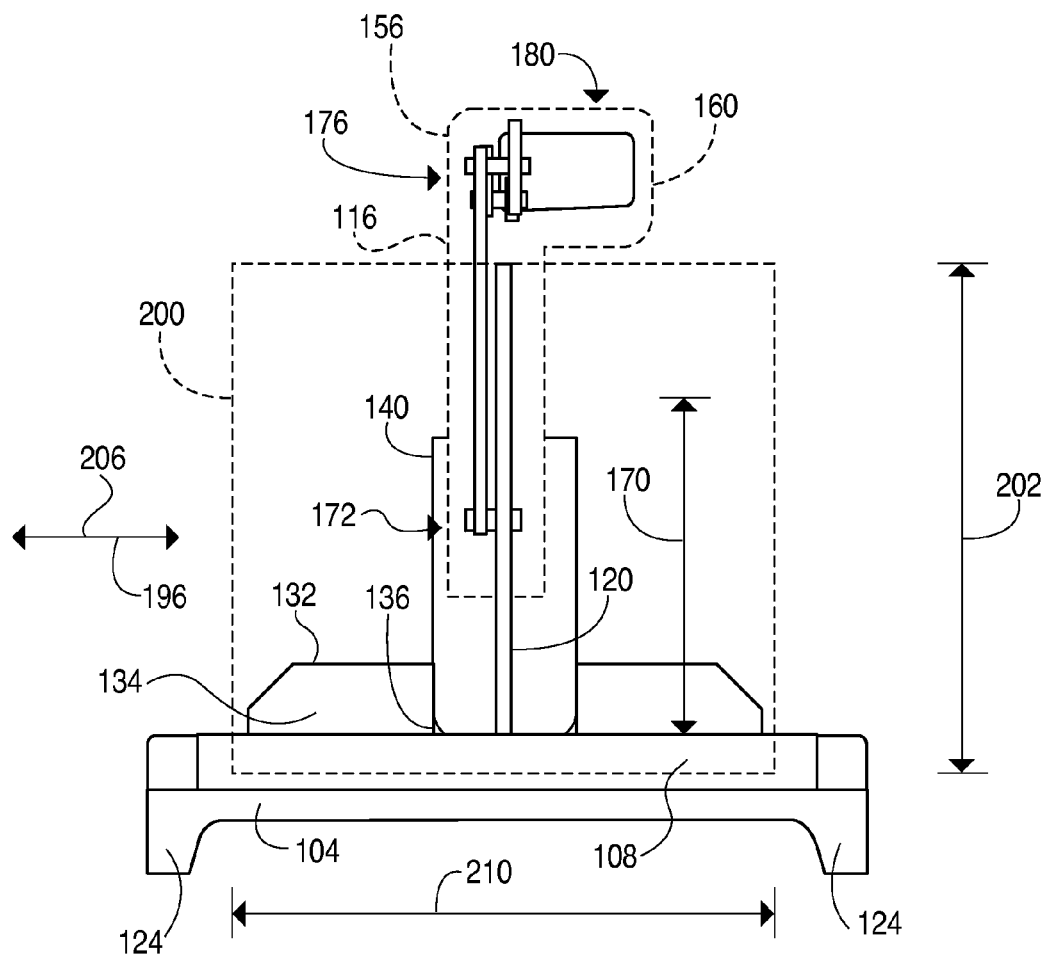
FIG. 2 is a front view of the miter saw of FIG. 1, the left shell and a right shell of the cutting arm are shown in phantom to enable viewing of the arbor assembly, the gear assembly, and the electric motor of the miter saw.

With reference to FIGS. 1 and 2, the miter saw 100 defines a nominal blade space 200. The nominal blade space 200 is a generally cylindrical volume. A diameter 202 of the nominal blade space 200 is approximately equal to a maximum design diameter. The maximum design diameter, as used herein, is the diameter of the largest saw blade the miter saw 100 is designed to accept. Accordingly, the diameter 202 of the nominal blade space 200 is independent of the diameter of the saw blade 120 that is mounted on the arbor assembly 172.

The nominal blade space 200 defines a longitudinal axis 206 (see FIG. 2), which is coaxial with the axis of rotation 196 of the arbor shaft 184. A length 210 of the nominal blade space 200 extends along the longitudinal axis 206 beyond the left shell portion 156 and the right shell portion 160 of the cutting arm 116. As shown in FIG. 2, the length 210 of the nominal blade space 200 is approximately equal to the diameter 202 of the nominal blade space.

As shown in FIGS. 1 and 2, the electric motor 180 and the gear assembly 176 are positioned outside of the nominal blade space 200. The position of the electric motor 180 and the gear assembly 176 enables the miter saw 100 to make high capacity cuts in a workpiece. Specifically, the position of the electric motor 180 and the gear assembly 176 prevents the electric motor and the gear assembly from abutting the workpiece, the workpiece support surface 128, and any other portion of the miter saw 100 that may interfere with the cutting arm 116 moving to the lowered position. Accordingly, the miter saw 100 is especially suited for cutting tall baseboards and tall crown moldings, which are positioned against the fence 132. Furthermore, when, for example, a ten inch nominal blade diameter saw blade 120 is attached to the arbor assembly 172, the miter saw 100 is capable of cutting through, for example, a 4×4 piece of construction lumber when the 4×4 is positioned directly below the arbor assembly.

Figure 4:
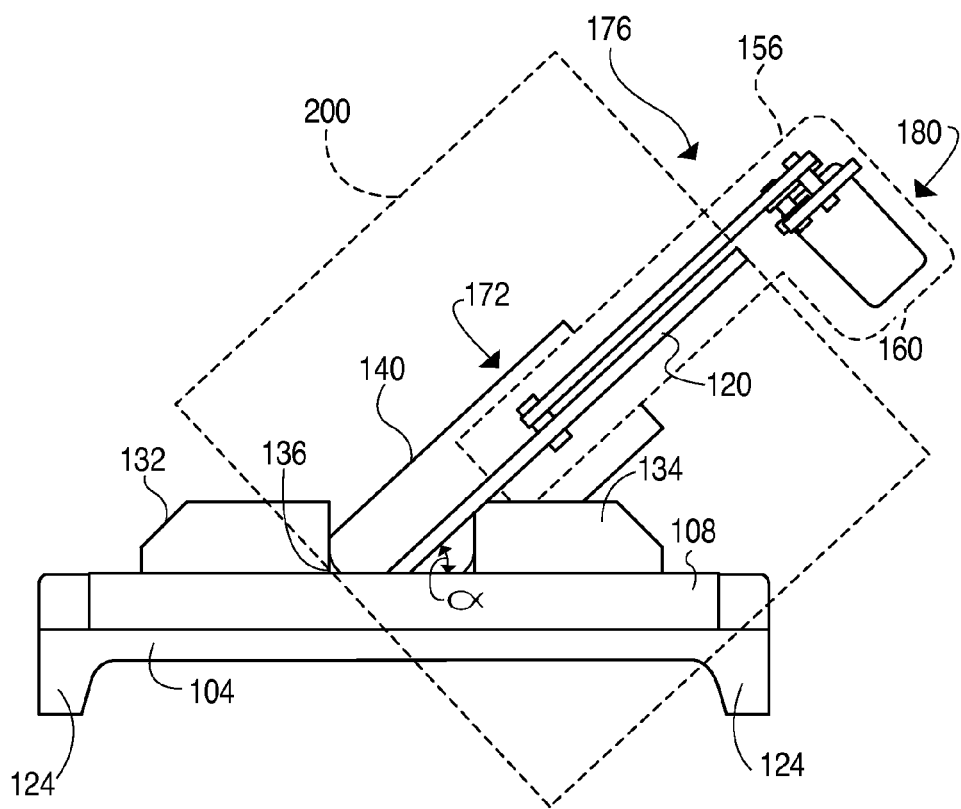
FIG. 4 is another front view of the miter saw of FIG. 1, showing the cutting arm in a position to make a beveled cut in a workpiece and also showing the left shell and the right shell of the cutting arm in phantom.

With reference to FIG. 4, positioning the electric motor 180 and the gear assembly 176 outside of the nominal blade space 200 prevents the electric motor and the gear assembly from limiting the motor-side bevel angle (shown as the angle a in FIG. 4) of the miter saw 100. In particular, the location of the electric motor 180 and the gear assembly 176 enables the cutting arm 116 to be moved to any bevel position without the electric motor or the gear assembly contacting the workpiece support surface 128 or any other portion of the miter saw 100 that may interfere with the bevel position of the cutting arm. The location of the electric motor 180 and the gear assembly 176 also enables the cutting arm 116 to move downward toward the turntable 108 to the lowered position without the electric motor or the gear assembly contacting the workpiece, the workpiece support surface 128, or any other portion of the miter saw 100 that may interfere with the position of the cutting arm.

In operation, the miter saw 100 is configured to cut a workpiece positioned on the workpiece support surface 128. To cut a workpiece, first the user places the workpiece on the workpiece support surface 128, usually against the face 134 of the fence 132. Next, the user supplies the electric motor 180 with electrical energy, which causes the motor shaft 232 and the pulley member 236 to rotate. The belt member 244 transfers torque from the pulley member 232 to the pulley member 224. The torque applied to the pulley member 224 causes rotation of the primary transmission shaft 208 and the gear member 216.

The meshing engagement of the gear member 216 with the gear member 212, results in rotation of the gear member 212 in response to rotation of the gear member 216. The rotation of the gear member 212 causes rotation of the secondary transmission shaft 204 and the pulley member 220. The belt member 240 transfers the torque of the pulley member 220 to the pulley member 192 and causes the arbor shaft 184 and the saw blade 120 to rotate.

After the saw blade 120 has reached a suitable angular velocity, the user moves the cutting arm 116 from the raised position (not shown) to the lowered position (see FIG. 1). As the cutting arm 116 is moved to the lowered position the saw blade 120 is moved through and cuts the workpiece. After the workpiece is cut, the user returns the cutting arm 116 to the raised position and eliminates the supply of electrical energy to the electric motor 180 to allow the saw blade 120 to stop rotating.

Figure 5:
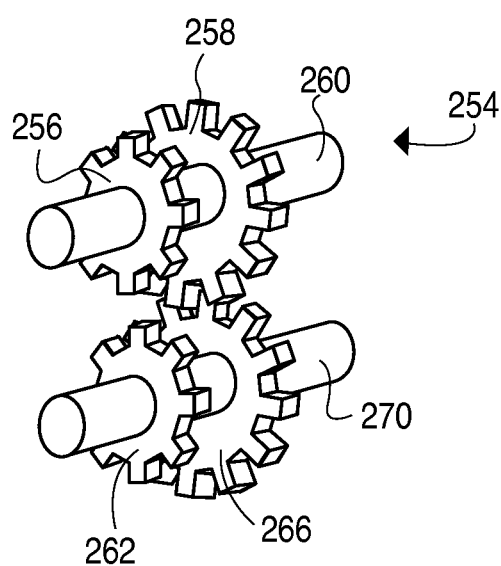
FIG. 5 is a perspective view of an alternative embodiment of the gear assembly of the miter saw of FIG. 1.

With reference to FIG. 5, in another embodiment, a miter saw may include a gear assembly 254. The gear assembly 254 is configured to transfer torque from the electric motor 180 to the arbor assembly 172 in substantially the same manner as the gear assembly 176. The gear assembly 254 includes a sprocket member 256 and a gear member 258 fixedly connected to a primary transmission shaft 260. The primary transmission shaft 260 is rotatably supported by the cutting arm 116. The gear assembly 254 further includes a sprocket member 262 and a gear member 266 fixedly connected to a secondary transmission shaft 270. The secondary transmission shaft is rotatably supported by the cutting arm 116.

In embodiments of a miter saw including the gear assembly 254, the pulley member 236 is replaced with a sprocket member (not shown) fixedly connected to the motor shaft 232. A first endless chain member (not shown) engages the sprocket member fixedly connected to the motor shaft 232 and the sprocket member 256. Additionally, the pulley member 192 is replaced with a sprocket member (not shown) fixedly connected to the arbor shaft 184. A second endless chain member (not shown) engages the sprocket member 262 and the sprocket member fixedly connected to the arbor shaft 184. Accordingly, the first endless chain member is configured to replace the belt member 244, and the second endless chain member is configured to replace the belt member 240.

In another embodiment of the miter saw, the electric motor 180 and the gear assembly 176 are positioned adjacent to the nominal blade space 200. Included in this embodiment is the configuration in which one or more of the electric motor 180 and the gear assembly 176 are positioned to intersect, touch, and/or abut the nominal blade space 200. Positioning the electric motor 180 and the gear assembly 176 adjacent to the nominal blade space 200 prevents the electric motor and the gear assembly from limiting the motor-side bevel angle of the miter saw 100.

While the miter saw 100 has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A miter saw having a circular saw blade, comprising:
   a base;
   a turntable rotatably connected to said base;
   a support assembly fixedly extending from said turntable;
   a cutting arm pivotally connected to said support assembly and defining a width;
   an electric motor mounted on said cutting arm and including a motor shaft, said electric motor configured for movement with said cutting arm;
   an arbor assembly rotatably supported by said cutting arm and defining an axis of rotation, said arbor assembly configured to support the circular saw blade for rotation about said axis of rotation;
   a gear assembly supported by said cutting arm, configured for movement with said cutting arm, and positioned entirely outside of a nominal blade space of the circular saw blade of said miter saw;
   a first belt member operatively connected to said arbor assembly and said gear assembly; and
   a second belt member operatively connected to said gear assembly and to said motor shaft,
   wherein said nominal blade space is a cylindrical volume centered about said axis of rotation, defining a diameter at least as large as a diameter of the circular saw blade, and
   wherein said gear assembly causes said first belt member to run at a different speed than a running speed of said second belt member and/or said gear assembly causes said first belt member to run in a different rotational direction than a rotational direction of said second belt member.

2. The miter saw of claim 1, wherein said motor shaft is positioned outside of said nominal blade space.

3. The miter saw of claim 1, wherein the gear assembly includes:
   a primary shaft rotatably supported by said cutting arm,
   a first gear member fixedly mounted on said primary shaft,
   a secondary shaft rotatably supported by said cutting arm,
   a second gear member fixedly mounted on said secondary shaft and configured to meshingly engage said first gear member.

4. The miter saw of claim 3, wherein the gear assembly further includes:
   a first pulley member fixedly mounted on said primary shaft, and
   a second pulley member fixedly mounted on said secondary shaft.

5. The miter saw of claim 4, wherein:
   said first gear member has a first gear diameter,
   said second gear member has a second gear diameter, and said first gear diameter is unequal to said gear second diameter.

6. The miter saw of claim 4, wherein:
said first belt member is engaged with said first pulley member, and
said second belt member is engaged with said second pulley member.

7. The miter saw of claim 1, wherein:
said support assembly includes a support arm fixedly extending from said turntable and a bevel arm pivotally connected to said support arm,
said cutting arm is pivotally connected to said bevel arm.

8. A miter saw, comprising:
a base;
a turntable rotatably connected to said base;
a support assembly fixedly extending from said turntable;
a cutting arm pivotally connected to said support assembly and defining a width;
a circular saw blade defining a nominal blade space;
a motor supported by said cutting arm and including a motor shaft, said motor located entirely outside of said nominal blade space;
an arbor assembly rotatably supported by said cutting arm and defining an axis of rotation, said arbor assembly configured to support said circular saw blade for rotation about said axis of rotation;
a gear assembly supported by said cutting arm, configured for movement with said cutting arm, and positioned entirely outside of said nominal blade space;
a first belt member operatively connected to said arbor assembly and said gear assembly; and
a second belt member operatively connected to said gear assembly and to said motor shaft,
wherein said nominal blade space is a cylindrical volume centered about said axis of rotation, defining a diameter at least as large as a diameter of said circular saw blade, and
wherein said gear assembly causes said first belt member to run at a different speed than a running speed of said second belt member and/or said gear assembly causes said first belt member to run in a different rotational direction than a rotational direction of said second belt member.

9. The miter saw of claim 8, wherein the gear assembly includes:
a primary shaft rotatably supported by said cutting arm,
a first gear member fixedly mounted on said primary shaft,
a secondary shaft rotatably supported by said cutting arm, and
a second gear member fixedly mounted on said secondary shaft and configured to meshingly engage said first gear member.

10. The miter saw of claim 9, wherein the gear assembly further includes:
a first pulley member fixedly mounted on said primary shaft, and
a second pulley member fixedly mounted on said secondary shaft.

11. The miter saw of claim 8, wherein:
said support assembly includes a support arm fixedly extending from said turntable and a bevel arm pivotally connected to said support arm, and
said cutting arm is pivotally connected to said bevel arm.

* * * * *